March 11, 1924.  1,486,238
L. E. FRANCE
ELECTRICAL MEASURING INSTRUMENT
Filed Aug. 18, 1919   2 Sheets-Sheet 1

INVENTOR
LESTER E. FRANCE
BY
Frank L. Sessions
ATTORNEY.

March 11, 1924.
L. E. FRANCE
ELECTRICAL MEASURING INSTRUMENT
Filed Aug. 18, 1919  2 Sheets-Sheet 2
1,486,238
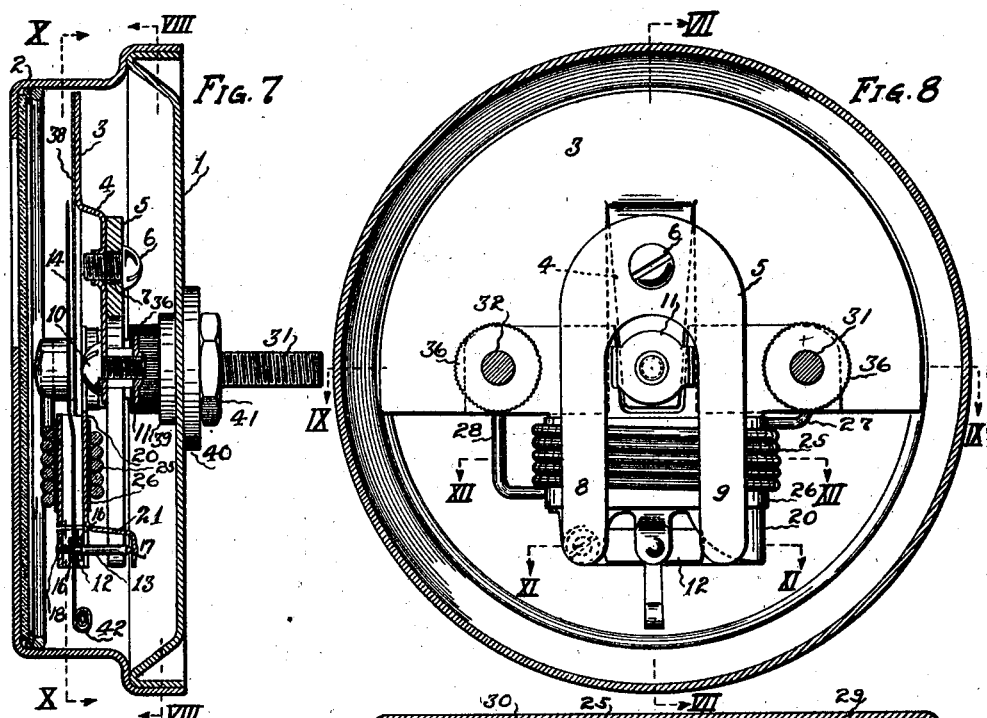
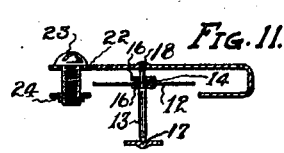
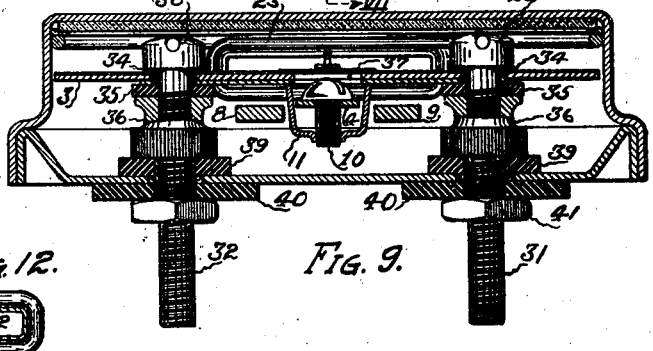
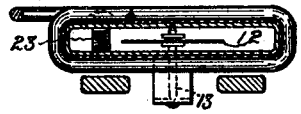
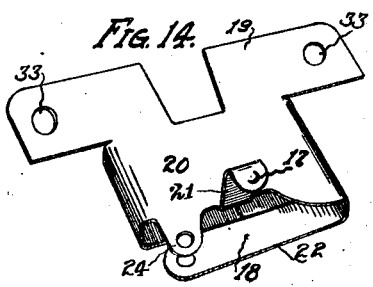
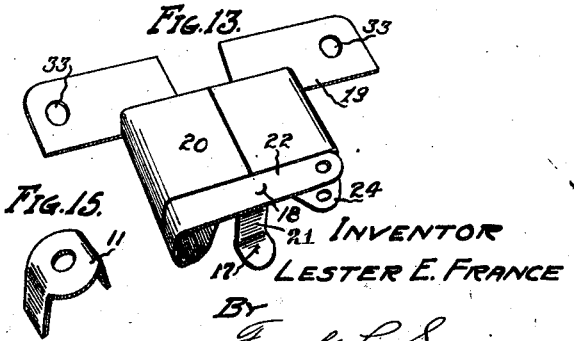
INVENTOR
LESTER E. FRANCE
BY
Frank L. Swing
ATTORNEY.

Patented Mar. 11, 1924.

1,486,238

UNITED STATES PATENT OFFICE.

LESTER E. FRANCE, OF CLEVELAND, OHIO.

ELECTRICAL MEASURING INSTRUMENT.

Application filed August 18, 1919. Serial No. 318,106.

*To all whom it may concern:*

Be it known that I, LESTER E. FRANCE, a citizen of the United States, residing at Cleveland, in the county of Cuyahoga and State of Ohio, have invented certain new and useful Improvements in Electrical Measuring Instruments, of which the following is a specification.

My invention relates to indicating electric meters such as ammeters, voltmeters and wattmeters, particularly of the direct current type.

The principle of operation of my instrument is well known in the art, it being that in which an armature pivoted to swing in the magnetic field of a permanent magnet is acted upon by the magnetic field of an electric coil to be deflected out of the zero position in which the permanent magnet tends to hold it, the amount of deflection of the armature from its zero position being a measure of the electric current flowing in the coil.

Among the objects of my invention are: the provision of a simple, strong, compact and durable construction particularly adapted to use upon motor vehicles; the provision of a construction which can be cheaply made; the provision of an instrument which can be quickly and accurately calibrated; the provision of an instrument which is self contained and operative without its enclosing case or other support; the provision of an instrument which can be calibrated without its enclosing case and not be subject to change in such calibration after the instrument has been enclosed in its case; the provision of an instrument which can be calibrated from its front side without removing it from its mounting; the provision of means for adjusting the distance between the permanent magnet and its armature; and the provision of means for adjusting the distance between the bearings of the armature staff.

These and other objects of my invention are accomplished by the use of the construction described in these specifications and shown in the accompanying drawings which, it will be understood, illustrate only one embodiment of my invention.

In the drawings—

Figs. 7, 8, 9 and 10 are sectional views of the instrument shown in Figs. 1 to 6 inclusive, Fig. 7 being a section upon line VII—VII of Fig. 8, Fig. 8 being a section on line VIII—VIII of Fig. 7, Fig. 9 being a section on line IX—IX on Fig. 8, and Fig. 10 being a section on line X—X of Fig. 7;

Fig. 11 is a detached sectional view through the armature staff and its bearings on line XI—XI of Fig. 8;

Fig. 12 is a section on line XII—XII of Fig. 8;

Fig. 13 is a top perspective view of the coil or armature bearing support;

Fig. 14 is a bottom perspective view of the coil or armature bearing support; and Fig. 15 is a perspective view of the magnet adjusting nut bracket.

Figure 2:
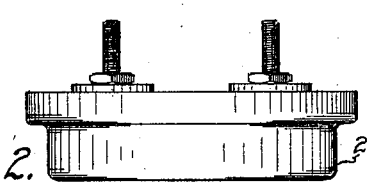
Fig. 2 is a plan view and Fig. 3 is a side elevation of an ammeter embodying my invention.
Figure 3:
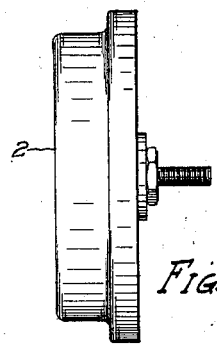
Figure 1:
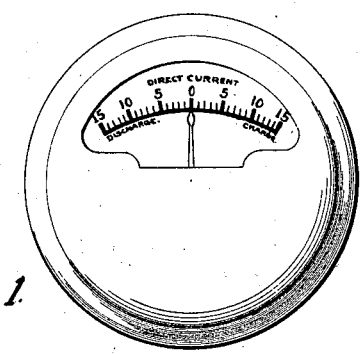
Fig. 1 is a front elevation.

The instrument shown in the drawings is a direct current ammeter constructed and calibrated to indicate the flow of current in either direction, such instruments being particularly adapted for use upon storage battery circuits. It will be understood by those skilled in the art that by the employment of suitable windings I may make either ammeters, voltmeters, or wattmeters embodying the principles of my invention and that the dials may be calibrated and the instruments constructed for zero reading at one end of the scale instead of at the center as shown in the accompanying drawings.

In the drawings, 1 represents the base and 2 the cover of the instrument. 3 is a dial-plate which has formed integrally with it, or attached thereto, the magnet support, 4. The magnet, 5, is secured to the magnet support, 4, by means of a screw, 6, the hole, 7, in the magnet, 5, for the reception of the screw, 6, being somewhat larger than the diameter of the screw to permit adjustment of the position of the magnet if desired.

The magnet support, 4, as shown in the drawings, is struck up out of the metal of the dial-plate and forms a spring yielding, hinge-like support for one end of the magnet, 5. As best seen in Figs. 7 and 8 the magnet support, 4, extends beyond the metal of the magnet, 5, over the space between the legs or poles, 8 and 9, of the magnet. The magnet adjusting screw, 10, passes through this extension of the magnet support and is threaded into an adjusting nut bracket, 11. The bracket, 11, abuts against the under side of the instrument frame, or, it may be made an integral part thereof, so that by turning the screw, 10, the position of the magnet, 5, relative to the stationary part of the frame may be varied.

Figure 10:
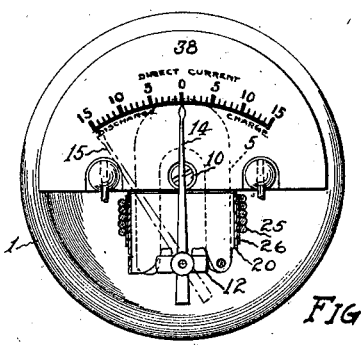
Figure 5:
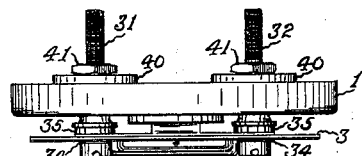
Figs. 4, 5 and 6 are respectively a front elevation, a plan view and a side elevation of the instrument shown in Figs. 1, 2 and 3, but with cover removed.

12 is a soft iron or steel armature mounted upon the staff or shaft, 13, and 14 is an indicating hand or pointer also mounted upon the staff, 13. In the drawings I have shown the armature, 12, and hand, 14, standing at right angles to each other. It will be understood by those skilled in the art that if it is desired to have the zero point of the dial scale at one end instead of at the center, the hand, 14, may be mounted upon the staff, 13, obliquely to the armature, 12, as is shown in dotted outline at 15 in Fig. 10.

Armature, 12, and hand, 14, together with retaining washers, 16, are pressed upon the staff, 13, so as to be fixed thereon to rotate with it. The staff, 13, has bearings at 17 and 18 in the bearing support member, 19, which, as shown is combined with a coil spool or support, 20, struck up out of the same piece of metal. The bearing, 17, is formed in a rigid or stationary bracket, 21, of the bearing support while the bearing, 18, is formed in a spring yielding or movable bracket, 22. The distance between the bearing, 17 and 18, may be varied by means of the adjusting screw, 23, which passes through a hole in the yielding bracket, 22, and is threaded into a lug 24, of the stationary or rigid portion of the bearing support member, 19. 25 is a deflecting coil which may be mounted upon the spool, 20, and insulated therefrom by suitable insulation such as 26, or, where the conductor on which the coil is wound is of sufficient strength, the spool, 20, may be entirely dispensed with and the coil be supported solely by its terminals, 27 and 28, which are secured to the heads, 29 and 30, of the posts, 31 and 32.

The armature, 12, is disposed so as to swing in the magnetic field of the electric coil, 25, the axis of the staff, 13, which is the axis of rotation of the armature, 12, being transverse to the axis of the electric coil. The permanent magnet, 5, is so disposed that its legs or poles, 8 and 9, are adjacent to the armature, 12, and also so disposed that its field of force is transverse to that of the electric coil, 25. When there is no current in the electric coil, 25, the armature, 12, will assume a certain position due to the force exerted upon it by the permanent magnet, 5. When current is passed through the deflecting coil, 25, the magnetic field due to such current will exert a force upon the armature to deflect it out of the position in which the permanent magnet, 5, tends to hold it, and, as above stated the amount of this deflection is the measure of the current flowing in the coil, 25.

I have found that within certain practical limits, sufficient for the purposes of such an instrument, the deflection is proportional to the current flowing when the permanent magnet is of the deep U-shape shown in the drawings. It is, therefore, possible to use previously printed dials upon my instruments, the deflection of the hands in different instruments of a given size and type being practically the same for the same current flowing.

Figure 4:
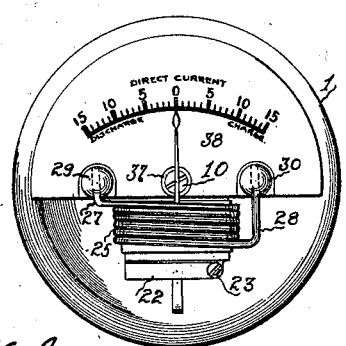

In order to bring the hand to the zero point of the dial when no current is flowing, the hand may be bent slightly to the right or left as seen in Fig. 4 or, the magnet, 5, may have its position changed slightly by loosening the screw, 6, and again tightening it after the magnet, 5, has been moved so as to bring the hand to the zero point. In order to make the indicating hand move to the graduation corresponding to the maximum value of current printed upon the dial scale when that current is flowing in the deflecting coil, I have provided means for varying the distance between the permanent magnet, 5, or its poles, 8 and 9, and the armature, 12. It will be understood that when the poles, 8 and 9, are nearer the armature, 12, they will exert a greater force upon it tending to resist its rotation about its staff axis than when they are farther removed from it. By varying the distance between the magnet poles and the armature, 12, it is therefore possible to control the deflection of the armature, 12, caused by the magnetic field of the coil, 25, and to so adjust the relative action of the permanent magnet and of the electric coil upon the armature, 12, as to secure the desired deflection of the indicating hand for any given current flowing in the coil.

The complete frame of my instrument comprises the dial-plate or frame, 3, the magnet support, 4, the coil or armature bearing support, 19, and the magnet adjusting nut bracket, 11. It is evident that two or more of these members may be formed in a single integral frame, but, for purposes of economy of material and simplicity of operations in manufacture and assembling I prefer to make the dial-plate, 3, and the coil or armature bearing support, 19, of separate parts. In the coil or armature bearing support, 19, holes, 33, are formed and similar holes, adapted to register with holes, 33, are formed in dial-plate, 3. When the frame is assembled, the dial-plate, 3, and the coil or armature bearing support, 19, are superposed one upon the other with their holes registering, and the binding posts, 31, 32, are inserted through the holes. One or both of the binding posts may be insulated from the dial-plate and the coil or armature bearing support by suitable insulations, such as are shown at 34, 35, and nuts, 36, may be used to clamp together the parts thus assembled.

After the armature, 12, and indicating hand, 14, have been assembled upon the staff, 13, the latter is placed in the bearings, 17, 18, and the distance between the bearings is properly adjusted and fixed by means of the screw, 23. The magnet, 5, being secured to the support, 4, and the dial scale fixed to the dial-plate, the instrument is ready for calibration in the manner described.

For securing the best results, the coil or armature bearing support, which is adjacent to the armature, 12, and the magnet poles, 8, 9, should be made of non-magnetic material such as brass, but the dial-plate, 3, and the magnet support, 4, may be made of iron or steel without detriment to the instrument. Economy of material may thus be secured by forming the dial-plate of the cheaper material.

Directly over the head of the screw, 10, a hole or other opening, 37, is formed in the dial, 38, to permit access to screw, 10, from the front of the instrument, to adjust the distance between the magnet, 5, and the armature, 12. It will be observed that this construction makes it possible to recalibrate the instrument by merely removing the front cover, 2, if for any reason it should be necessary to do so after the instrument has been in service.

To support the instrument upon its base, 1, I prefer to extend the binding posts, 31, 32, through it and to insulate one or both of them from the base by suitable insulation such as that shown at 39, 40. Nuts, 41, may be used to secure the instrument to the base, 1. It will be observed that the instrument may be mounted directly upon the metal dash of an automobile if desired by means of the binding posts, 31, 32, and nuts, 41.

Figure 6:
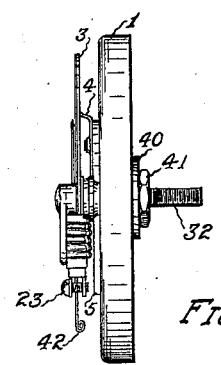

The hand, 14, is balanced upon the staff, 13, by varying the length of the end opposite the indicating end. This is readily accomplished by coiling the metal as shown at 42, Figs. 6 and 7.

The advantages of my invention, including simplicity, strength, low cost of manufacture and pleasing appearance as well as accuracy and durability, will be apparent to those skilled in the art.

I claim:

1. In an instrument of the class described, a dial plate, a permanent magnet, said magnet being yieldingly secured to said dial plate, and adjusting means for varying the distance of said magnet from said dial plate.

2. In an instrument of the class described, an electric coil, an armature pivoted to rotate in the magnetic field of said coil, indicating means mounted for rotation with said armature, a stationary dial plate, a permanent magnet yieldingly connected at one end to said dial plate, the free end of said magnet being disposed so that its magnetism tends to hold said armature in one position, and adjusting means for varying the distance between the free end of said magnet and said armature.

3. In an instrument of the class described, an electric coil, a pivoted armature disposed for rotation in the magnetic field of said coil, a permanent magnet spring-hinged to a stationary support and disposed so that its magnetism yieldingly holds said armature in one position, and means for moving said magnet about its spring-hinge to vary the distance between said magnet and said armature.

4. In an instrument of the class described, an electric coil, a pivoted armature disposed for rotation in the magnetic field of said coil, a permanent magnet spring-hinged to a stationary support, and disposed so that its magnetism yieldingly holds said armature in one position, and means including screw adjusting means connecting said magnet and said stationary support for varying the distance between said armature and said magnet.

5. In an instrument of the class described, an electric coil, an armature pivoted for rotation in the magnetic field of said coil, a permanent magnet having its poles disposed so that its magnetism tends to hold said armature in one position, said magnet being supported by a hinge-like support at one end, and adjusting means for varying the distance between said poles and said armature transversely to the plane of rotation of said armature.

6. In an instrument of the class described, a dial plate, a spring-yielding projection on said plate, a permanent magnet secured to said projection, said magnet extending from said projection in substantial parallelism with said plate, means for bending said spring-yielding projection to vary the distance between said magnet and said plate, an electric coil having its axis substantially parallel to said plate and said magnet, and an armature pivoted for rotation in the magnetic field of said coil, said armature being normally held in one position by the magnetism of said magnet.

7. In an instrument of the class described, a dial plate having a pair of perforations, a coil support having a pair of perforations adapted to register with the perforations in said dial plate, said dial plate and said coil support being superposed one upon the other with their perforations registering, binding posts passing through said registering perforations, one of said binding posts being insulated from said dial plate and said coil support, and means including said binding posts for securing said dial plate and said coil support in fixed relation to each other.

8. In an instrument of the class described, an electric coil, an armature pivoted to rotate in the magnetic field of said coil, indicating means mounted for rotation with said armature, a long U-shaped, permanent magnet disposed outside said coil in a plane substantially parallel to the axis of said coil, the poles of said magnet being disposed so as to exert magnetic force upon said armature to yieldingly hold it in one position, and adjusting means for varying the distance between said magnet and said armature.

9. In an instrument of the class described, a frame comprising a stationary body portion and a yielding portion adapted to support a magnet, a magnet supported thereon, and means for varying the distance between said magnet and said stationary body portion of said frame.

10. In an instrument of the class described, a dial plate, a bearing support, binding post means securing said dial plate and said bearing support in fixed relation to each other, an armature mounted upon a staff, said staff having its ends resting in bearings in said bearing support, said bearing support having a non-adjustable portion in which one of said bearings is located, and a spring-yielding portion in which the other of said bearings is located, and adjusting means connecting said stationary and said yielding portions for varying the distance between said bearings.

11. In an instrument of the class described a coil support struck up out of sheet metal and having armature bearing supports formed integrally therewith, one of said bearing supports consisting of a non-adjustable bracket and the other a spring-yielding bracket, both brackets projecting from said coil support, said spring-yielding bracket being adapted to yield towards and away from said stationary bracket, an armature staff bearing in each of said brackets, and screw adjusting means adapted to bend said spring-yielding bracket to vary its distance from said non-adjustable bracket.

12. In an instrument of the class described, a plate having a yielding, magnet-supporting portion extending from the body thereof, a magnet secured to said magnet-supporting portion, and adjusting means connecting said yielding portion and said body of said plate for bending said yielding portion and thus changing the relative positions of said plate and said magnet.

13. In an instrument of the class described, a plate having a yielding, magnet-supporting portion extending from the body thereof, a magnet secured to said magnet-supporting portion, said magnet-supporting portion being offset from the plane of said plate and adapted to position said magnet in a plane also offset from the plane of said plate and means for bending said yielding portion and thus adjusting the position of said magnet relative to said plate.

14. In an instrument of the class described, a plate having a yielding, magnet-supporting portion extending from the body thereof, a magnet secured to said magnet-supporting portion, a U-shaped bracket abutting against said plate and spanning said magnet-supporting portion, and an adjusting screw connecting said bracket and said magnet-supporting portion for varying the distance between them.

15. In an instrument of the class described, a plate having a yielding, magnet-supporting portion extending therefrom, a bracket depending from said plate projecting across and spaced from said magnet-supporting portion, and adjusting means connecting said bracket and said magnet-supporting portion for varying the distance between them.

16. In an instrument of the class described, the combination with a frame comprising a dial plate, a yielding magnet support, an armature bearing support and a magnet adjusting nut bracket, of an adjusting screw connecting said magnet support and said nut bracket.

17. In an instrument of the class described, an electric coil, a frame comprising a dial plate, coil support and armature bearing support and means for holding said parts in fixed relation to each other, an armature pivoted for rotation in bearings in said bearing support, a magnet adjustably supported on said frame so disposed that its magnetism yieldingly holds said armature in one position, and means for adjusting the position of said magnet relative and transversely to the plane of rotation of said armature.

In testimony whereof I affix my signature.

LESTER E. FRANCE.